United States Patent [19]

Sasaki et al.

[11] Patent Number: 4,468,580

[45] Date of Patent: Aug. 28, 1984

[54] AC GENERATOR DIRECTLY COUPLED WITH INTERNAL COMBUSTION ENGINE

[75] Inventors: Susumu Sasaki; Masayuki Shizuka, both of Katsuta, Japan

[73] Assignee: Hitachi, Ltd., Tokyo, Japan

[21] Appl. No.: 434,056

[22] Filed: Oct. 13, 1982

[30] Foreign Application Priority Data

Oct. 14, 1981 [JP] Japan ................................ 56-162660

[51] Int. Cl.³ ............................................. H02K 13/04
[52] U.S. Cl. .................................. 310/237; 310/68 D
[58] Field of Search ............... 310/127, 133, 67 R, 310/68 D, 219, 225, 232, 237, 247, 263, 151, 113; 123/599, 149 A, 149 D, 195 E

[56] References Cited

U.S. PATENT DOCUMENTS

| 2,433,881 | 1/1948 | Alstrom | 123/195 E |
| 3,009,428 | 1/1970 | Cotton et al. | 310/232 |
| 3,596,122 | 7/1971 | Stewart | 310/67 |
| 4,088,914 | 5/1978 | Aoki | 310/237 |

FOREIGN PATENT DOCUMENTS

| 568157 | 6/1958 | France | 310/237 |
| 56-31346 | 3/1981 | Japan | |

*Primary Examiner*—J. D. Miller
*Assistant Examiner*—D. L. Rebsch
*Attorney, Agent, or Firm*—Antonelli, Terry and Wands

[57] ABSTRACT

An AC generator for internal combustion engines comprises a stator including an armature core, a generator coil and an output terminal connected to an end of the coil; a rotor fitted on the forward end of a crankshaft and including a hub secured by a mounting screw axially at the end of the crankshaft, claw tooth magnetic poles pressure-fitted on the boss, and a field coil arranged in the space formed by the claw tooth magnetic poles and the hub; a collector device including a first collector conductor, arranged substantially at a central part of the rotor electrically connected to an end of the field coil and an annular second collector conductor, arranged along a circumference of the rotor, electrically connected to the other end of the field coil; and a first brush in sliding contact with the first collector conductor and a second brush in sliding contact with the second collector conductor.

4 Claims, 12 Drawing Figures

AC GENERATOR DIRECTLY COUPLED WITH INTERNAL COMBUSTION ENGINE

The present invention relates to an AC generator with brushes directly coupled to an internal combustion engine of a motor cycle or the like, and more particularly, to an AC generator for an internal combustion engine, including collectors suitable for an internal combustion engine high in vibrations and rotational speed.

An AC generator of this type for internal combustion engines is disclosed, for example, in Japanese Patent Application No. 31346/81 filed on Mar. 6, 1981 by Hitachi Ltd. Such an AC generator of rotary field type directly coupled to a crankshaft of the internal combustion engine is shown in the partly cut-away sectional view of FIG. 1.

A rotor 3 is secured to a crankshaft 2 of an engine (not shown), protruded in the direction perpendicular to the end surface of a crank case 1. The rotor 3 includes a cylindrical hub 4 whose tapered portion is fitted with a tapered end portion of the crankshaft 2, first and second claw tooth magnetic poles 5 and 6 securely fitted to the hub 4 in such a manner that peripheral claws thereof are alternately opposed to each other, and a field coil 7 wound on an outer periphery of the hub 4 and held between the claw tooth magnetic poles 5 and 6. The hub 4 is securely fastened to the crankshaft 2 by a mounting screw 9 inserted from a recess 8 for mounting the screw 9 of the hub 4 and engaged in the crankshaft.

An armature core 10 is arranged with a gap outward of the outer periphery of the rotor 3, and is secured with a screw 12 on a stepped portion of the inner periphery of a cup-shaped generator cover 11 of aluminum material. The generator cover 11 is secured to a base 1A on the outer wall of the crankcase 1 by screws 13 at several points of the outer peripheral opening 11A thereof.

A flat collector unit 15, including an annular mold insulation plate 16, is embedded with a first collector 17 and a second collector 18 as shown in detail in FIGS. 2 and 3. The first collector 17 is made of a linear plate arranged through the insulation plate 16 radially outward from the axial center of the insulation plate 16, so that an end 17A thereof is exposed at the axial center of the insulation plate 16 to form a surface in contact with a brush, while the other end 17B thereof is exposed radially of the insulation plate 16 to form a coupling terminal for the lead wire 7A connected to the starting end of the coil 7. The second collector 18, on the other hand, is an annular plate with the upper side thereof exposed and has a back side partially provided with a terminal plate 19 coupled electrically therewith by solder or the like. An end 19A of the terminal plate 19 is exposed radially outward of the insulation plate 16 and is coupled to the lead wire 7B connected to the tail end of the coil 7.

The collector unit 15 constructed in this way is securely mounted concentrically with the rotary shaft on the side of the rotor opposite to the engine by use of screws (not shown) inserted into the screw holes 15A (FIG. 2). A brush holder 20 holds a brush 21 in contact with the first collector 17 and a brush 22 in contact with the second collector 18, which brush holder 20 is secured by a screw 23 to the pedestal 11B formed on the inner wall of the generator cover 11.

The armature core 10 is connected through a lead wire 24 and a connector 27 to a battery (not shown).

The brushes 21 and 22 are connected to the negative and positive electrodes of the battery through lead wire 25, 26 and the connector 27, respectively. The exciting current for the field coil 7, as shown by an arrow 30 in FIG. 1, flows through the lead wire 26, brush 22, collector 18, lead wire 7B, field coil 7, lead wire 7A, collector 17, brush 21, and lead wire 25 in that order.

In the construction of FIG. 1, the claw tooth magnetic poles 5 and 6 and the field coil 7 are mounted on the hub 4 to form the rotor 3. The collector 15 is screwed to the side of the resulting assembly, followed by the coupling terminals 17B, 19 of the collectors 17, 18 being soldered to the lead wires 7A and 7B of the field coil 7 respectively. The rotor is fitted on the rotor shaft 2 and fastened with the mounting screw 9. The exposed portion 17A of the first collector 17, which makes up a roadblock for fastening the screw 9, is temporarily bent perpendicularly and is restored to original position after fastening the mounting screw 9.

The AC generator for the internal combustion engine of this construction is such that when the engine starts, the rotor including the hub 4 directly coupled to the crankshaft 2, the claw tooth magnetic poles 5, 6 and the field coil 7 rotates. Since a field current is supplied to the field coil 7, the magnetic fluxes generated in the field coil 7 are passed along the route as shown by an arrow 32 in the armature core 10 through an air gap 34 from the claw tooth magnetic poles 5, 6, and an alternating current is generated in a generator coil 28 by an alternating magnetic field, so that the AC current is supplied through the lead wire 24 and the connector 27 to the battery.

In the AC generator of this type, the rotor is of cantilever type and therefore is incapable of being exactly concentric with the rotary shaft for the reasons of manufacture. Instead, with the increase of engine speed, the rotor is more easily affected by the vibrations of the engine or core deflection and the second brush 22 positioned outward of the center of the rotor develops a great amplitude, sometimes leading to the breakage of the brush pigtail or the damage of the brush.

The AC generator constructed as mentioned above comprises a first collector 17 of a flat collector unit arranged substantially at the central portion of the rotor in contact with a first brush 21, and a second collector 18 arranged on a small circumference from the center of the rotor and in contact with a second brush 22.

As a result, while the rotor rotates, the first brush 21 does not substantially slide on the first collector 17, whereas the second brush 22 slides on the second collector 18 over a very short distance.

The wear of the brushes 21 and 22 are thus reduced considerably and therefore the brushes need not be lengthened, thus making it possible to shorten the axial length of the generator.

Further, since the second collector 18 has a small radius, the amplitude of the brush 22 in contact therewith is also small. The breakage of the pigtail or the brush can thus be prevented, thereby providing a collector unit of cantilever type suitable for the high-speed generator.

In the AC generator which is constructed and operates as described above, the first collector 17 is arranged almost at the central part of the hub 4 in such a manner as to cover the head of the mounting screw 9, and therefore, when fastening the rotor with the screw 9, the exposed portion 17A of the collector 17 is required to be bent temporarily beforehand and, after fastening the screw 9, is required to be restored to original position, thus deteriorating the workability.

Another disadvantage of this AC generator is that, since the collector 17 is arranged in suspended form at the central part of the rotor and is kept pressed by the brush 21, the engine vibrations that may be applied to the collector 17 may damage the collector 17 and the brush 21.

Accordingly, it is an object of the present invention to provide an AC generator for the internal combustion engine, in which the life of the collector unit under vibration is improved.

According to the present invention, there is provided an AC generator for internal combustion engines in which the collector arranged at the central portion of the rotor is integrally secured to the rotor.

The above and other objects, features and advantages will be made apparent by the detailed description taken in conjunction with the accompanying drawings, in which.

Figure 1:
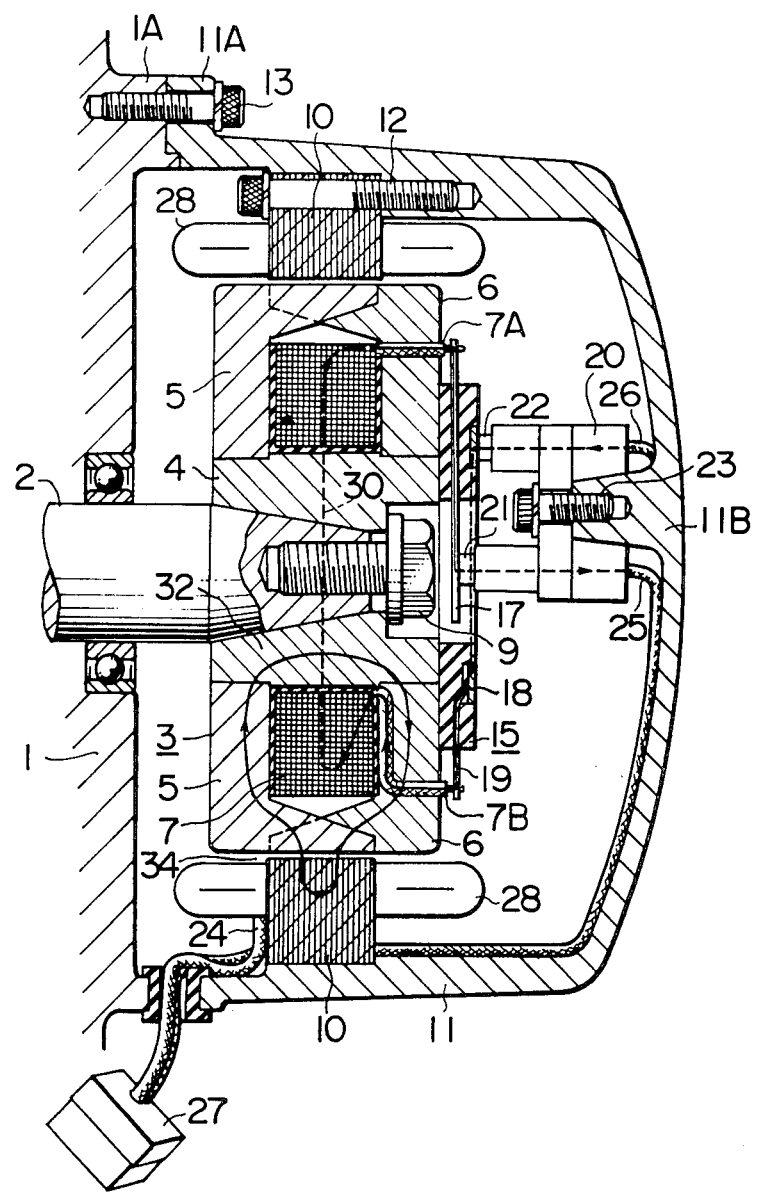
FIG. 1 is a partly cut-away sectional view of an AC generator for internal combustion engines.
Figure 2:
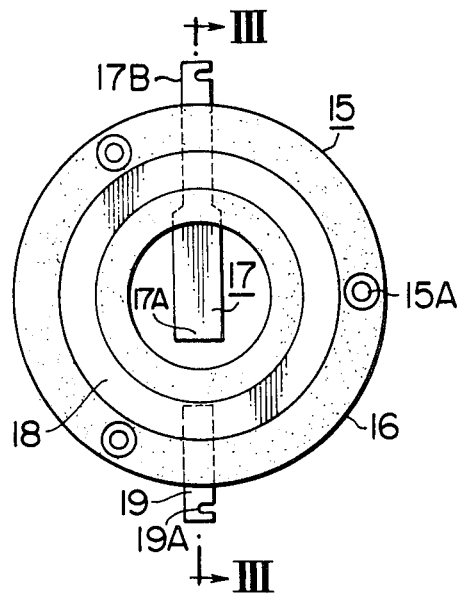
FIG. 2 is a front view of a collector unit for the AC generator shown in FIG. 1.
Figure 3:
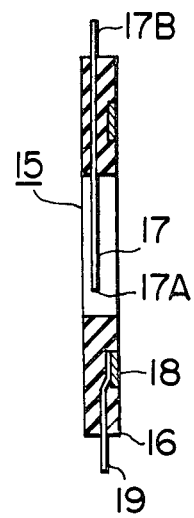
FIG. 3 is a sectional view of the collector unit taken in the line III—III in FIG. 2.
Figure 6:
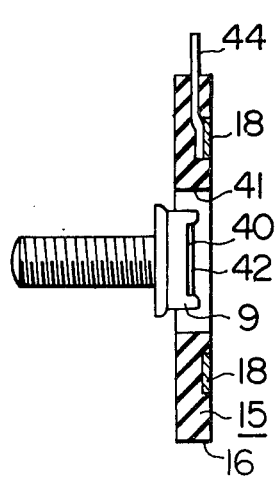
FIG. 6 is a sectional view of the collector unit taken in the line VI—VI in FIG. 5.
Figure 5:
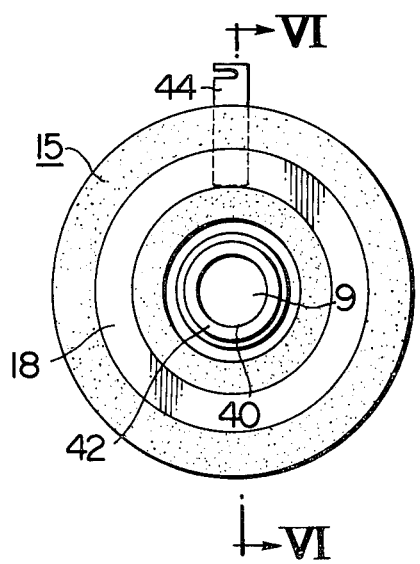
FIG. 5 is a front view of the collector unit shown in FIG. 4.

Referring once again to the drawings wherein like reference numerals are used throughout the various views to designate like parts, and, more particularly, to FIGS. 4–9, according to these figures, a recess 40 is formed in the head of the mounting screw 9 which secures the hub 4 to the engine crankshaft 2. A collector conductor 42 of a copper plate is arranged in the recess 40. A flat slip ring 15 making up a collector unit is arranged on the edge of the hub 4 along the periphery of the head of the mounting screw 9. In other words, the head of the mounting screw 9 is positioned in the space at the central part of the slip ring 15.

Figure 7:
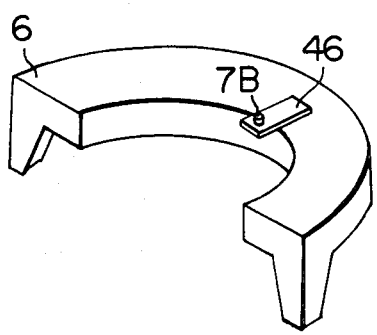
FIG. 7 is a perspective view of a connector of the lead wire for the field coil shown in FIG. 4.

An annular conductor 18, insulated from the surrounding parts, is arranged in the flat slip ring 15. Part of the annular conductor 18 is projected as a terminal 44 outward of the periphery of the slip ring 15, and the projected part is connected with the lead wire 7A of the field coil 7. The other lead wire of the field coil 7 is soldered to a connector 46, which in turn is welded to the side of the claw tooth magnetic pole 6 as shown in FIG. 7. The brush 21 is in sliding contact with the collector unit 42 of this construction. Also, the second brush 22 is in sliding contact with the annular conductor 18. The first and second brushes 21 and 22 are held by a brush holder 20.

The brush holder 20 made of an insulating material is secured to the bottom of a generator cover 11B by mounting screws 23 through mounting holes 46A and 46B. The brushes 21 and 22 are contained in an insulating brush case 60, and connected to terminal plates 48 and 50, respectively, through pigtails 52 and 54, which terminal plates 48 and 50 are connected, in turn, to the lead wires 25 and 26, respectively.

In the AC generator of this construction, assume that the lead wires 26 and 25 are respectively connected to positive and negative electrodes of a battery (not shown) through a connector 27. The field current flows into the brush 21 in the manner shown by an arrow 62 from the brush 22 through the annular conductor 18, terminal 44, lead wire 7A, field coil 7, lead wire 7B, connector 46, hub 4, mounting screw 9, recess 40 of the mounting screw 9, and the collector conductor 42 in that order. With the start of the engine, therefore, the rotor rotates and an alternating current is produced from the generator coil 28, thus achieving the same effect as the generator of FIG. 1.

The collector 42 may alternatively be mounted in the recess 40 of the mounting screw 9 by pressure-fitting a circular copper plate therein or by welding the copper plate to the recess 40.

According to the embodiment under consideration, the recess 40 is formed in the head of the mounting screw 9 for securing the hub 4 to the engine crankshaft 2 at the central part of the rotor, and the collector conductor 42 is mounted in the recess 40. Even when the first brush 21 is pressed against the collector conductor 42, the collector conductor 42 remains immovable since the collector conductor 42 is supported by the head of the mounting screw 9. Also, even if the engine vibrations are transmitted to this assembly, therefore, the collector conductor 42 is not damaged. As a result, the service life of the collector conductor 42 is greatly improved, thus making it possible to mount it on the high-speed high-vibration engine.

Further, in view of the fact that the head of the mounting screw 9 is integrated with the collector conductor 42, the rotor integrally assembled by the magnetic poles 5, 6, the field coil 7 and the slip ring 15 is capable of being fitted on the crankshaft 2 and secured thereto by the screw 9. This eliminates the requirement of bending the collector conductor 17 as in FIG. 1, thus facilitating the assembly work of the rotor on the crankshaft.

Figure 10:
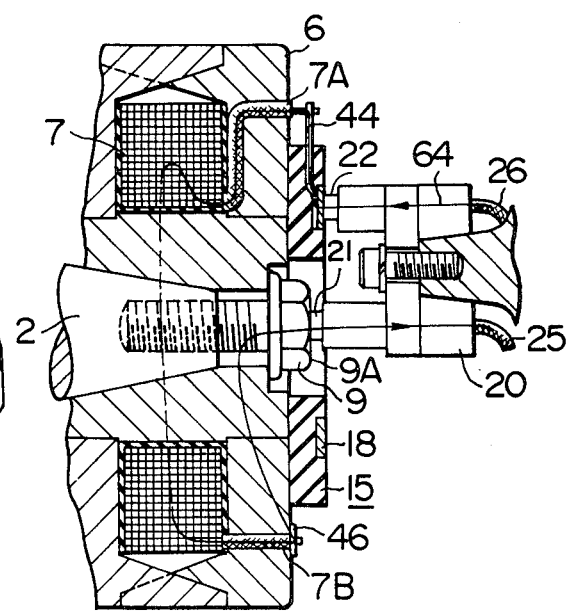
FIG. 10 is a sectional view of the essential parts of the AC generator for internal combustion engines according to a second embodiment of the present invention.

As shown in FIG. 10, the collector conductor 42 in sliding contact with the brush 21 is not used. Instead, the mounting screw 9 is conductive, and the head 9A of the screw 9 in sliding contact with the brush 21 is used as a collector conductor. According to this embodiment, the field current flows in the same manner as in the first embodiment as shown by an arrow 64, from the mounting screw 9 to the brush 21 through the screw head 9A.

The embodiment of FIG. 10 does not use the collector conductor 42 but the head 9A of the mounting screw 9 is used directly as a collector conductor, and therefore, the collector unit is, on the one hand, constructed in a simple way on the other hand and, as in the first embodiment of FIGS. 4–9, the damage of the collector conductor by the engine vibrations is substantially prevented, thus facilitating the mounting of the engine on the rotor.

Figure 4:
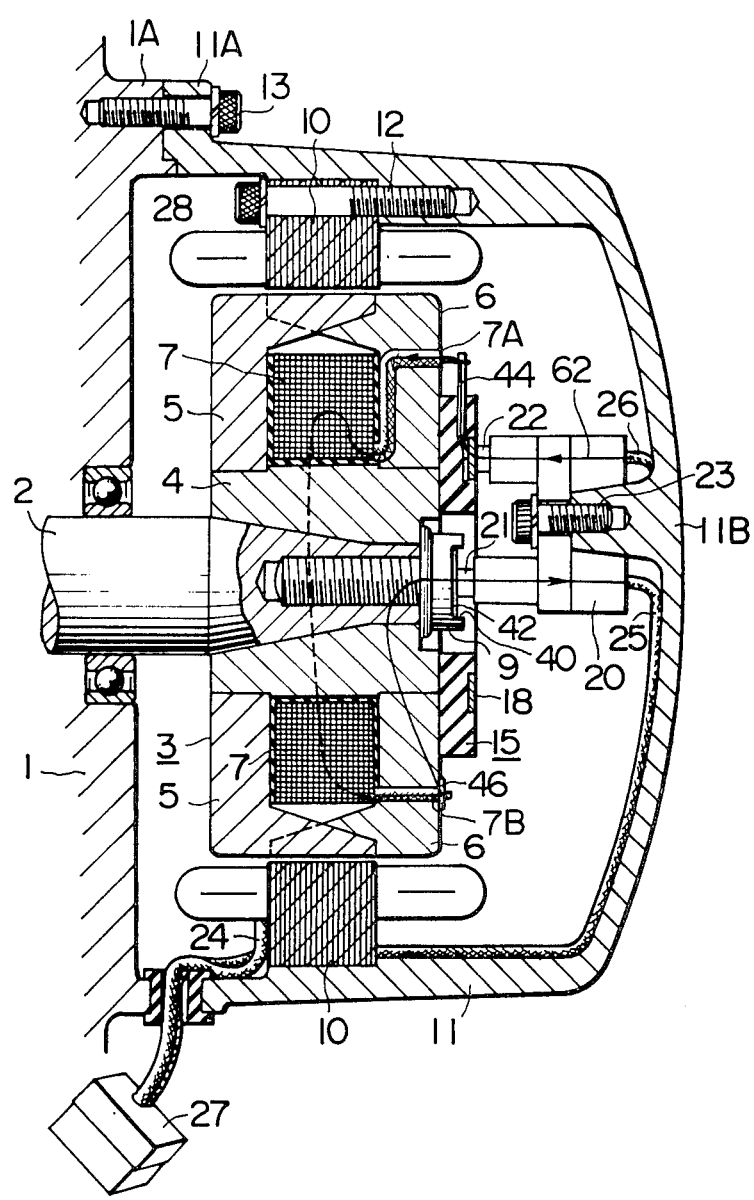
FIG. 4 is a partly cut-away sectional view of an AC generator for internal combustion engines according to a first embodiment of the present invention.
Figure 8:
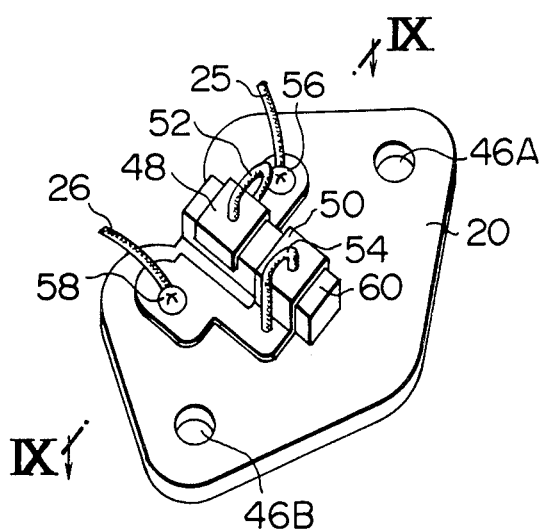
FIG. 8 is a schematic diagram showing a brush holder shown in FIG. 4.
Figure 9:
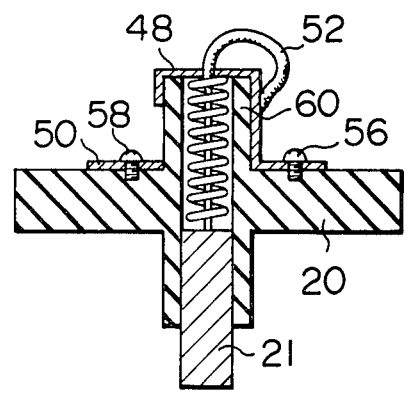
FIG. 9 is a sectional view of the brush holder of FIG. 8 taken in the line IX—IX in FIG. 8.
Figure 11:
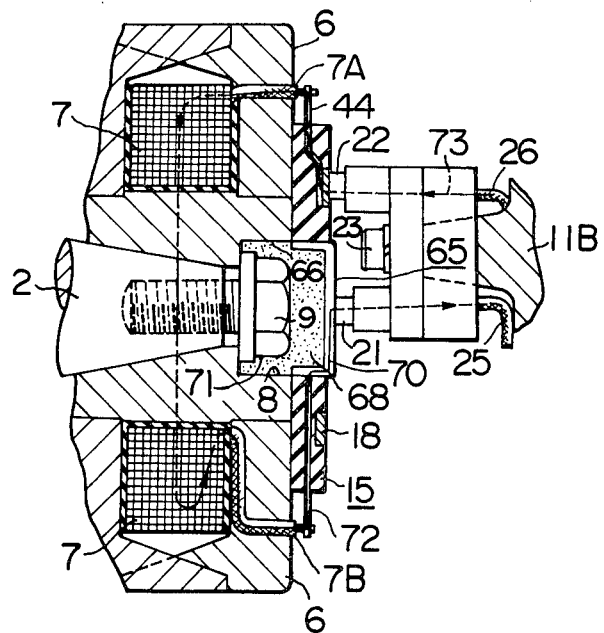
FIG. 11 is a sectional view of the essential parts of the AC generator for internal combustion engines according to a third embodiment of the present invention.

In the embodiment of FIG. 11, the second collector conductor 42 of the embodiment of FIG. 4 is replaced by a cylindrical cap 65 pressure-fitted into the screw-mounting recess 8 of the boss 4, with the cap 65 being fabricated in the following manner.

A ring 70 of a conductor is fitted into an end of a cylindrical cap 66, and resin is injected into the cap 66, thereby to integrate the cap 66 and the ring 70 to each other. A recess 71 for receiving the head of the screw 9 is formed in the resin. The cap 65 thus formed is pressure-fitted into the hollow portion of the slip ring 15 (corresponding to 41 in FIG. 6) and the recess 8 of the hub 4. The brush 21 is thus in sliding contact with the conductor ring 70. The recess 71 of the resin 68 and the head of the screw 9 may be threaded so that the resin may be screwed into the head of the screw 9. The end of the lead wire 7B of the coil 7, on the other hand, is connected to an end of a plate terminal 72, and the other end of the terminal 72 is electrically connected with the periphery of the conductor ring 70 through the slip ring 15.

In this configuration, the field current flows, as shown by an arrow 73, from the brush 22 through the annular collector conductor 18, terminal 44, lead wire 7A, coil 7, lead wire 7B, terminal 72, conductor ring 70 to the brush 21.

According to the embodiment of FIG. 11, the slip ring integrated with the rotor is secured to the crankshaft 2 by the screw 9, followed by the pressure-fitting of the cap 65 therein. The embodiment of FIG. 11 under consideration has the same advantage as the first and second embodiments of FIGS. 4-10.

Figure 12:
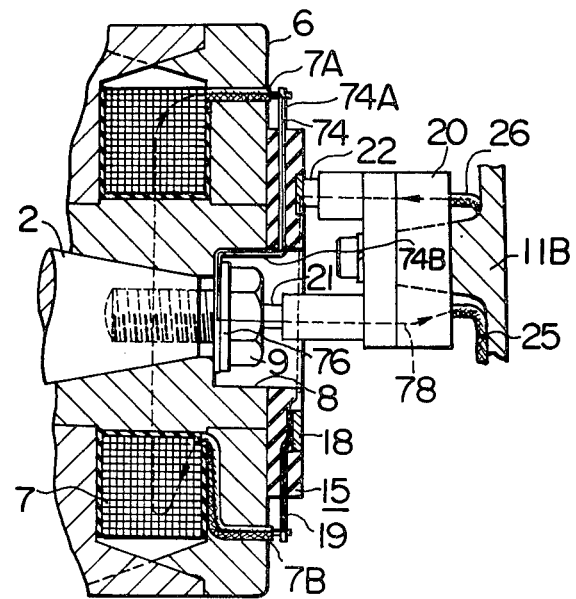
FIG. 12 is a sectional view of the essential parts of the AC generator for internal combustion engines according to a fourth embodiment of the present invention.

In the embodiment of FIG. 12, a collector unit of an AC generator includes a collector 74 instead of the linear first collector 17 so that the head of the screw 9, as a conductor, is in sliding contact with the brush 21, and an end 74A of the collector 74 is connected to the lead wire 7A, while the other end 74B thereof of secured to the head of the screw 9 through a washer 76 at the bottom of the recess 8 of the hub 4. The annular conductor 18 making up a second collector is connected to a terminal plate 19 connected to the lead wire 7B.

The embodiment of FIG. 12 is such that the slip ring 15 assembled with the rotor and the collector 74 is integrally fitted on the crankshaft 2. After that, the rotor and the slip ring 15 are secured to the crankshaft 2 by the screw 9 and the washer 72. The field current flows, as shown by an arrow 78, from the brush 22, through the annular conductor 18, terminal plate 19, lead wire 7B, coil 7, lead wire 7A, collector 74 and screw 9 to the brush 21.

In the embodiment of FIG. 12 the first and second collectors are protected from damage by engine vibrations, thus leading to the same advantage as the preceding embodiments.

It will be understood from the foregoing description that according to the present invention, there is provided an AC generator for internal combustion engines, in which the engine is easily mounted on the rotor while at the same time greatly lengthening the service life of the collector conductors against engine vibrations.

We claim:

1. An AC generator for internal combustion engines, comprising:
   a generator casing;
   a stator including an armature core, a generator coil and an output terminal connected to an end of said coil, said stator being secured to an inner wall of said casing;
   a rotor fitted on a forward axial end of a crankshaft and including a hub secured by a mounting screw axially at the end of said crankshaft, claw tooth magnetic poles pressure-fitted on said hub, and a field coil arranged in a space formed by said claw tooth magnetic poles and said hub, said mounting screw being disposed coaxially with said crankshaft and electrically connected to one end of said field coil, and said rotor being arranged inside of said stator;
   a collector device including an annular conductor electrically connected to the other end of said field coil and arranged along a circumference of a predetermined radius from a center of said rotor, said collector device being secured to the axial end of said rotor; and
   brush means including a first brush electrically connected to a head of said mounting screw, and a second brush in sliding contact with a second collector conductor, said brush means being secured to said casing, whereby a field current flows through a path including said one end of said field coil, said mounting screw and said first brush.

2. An AC generator according to claim 1, wherein the head of said mounting screw has a recess to which a collector conductor is secured, said one end of said field coil is connected electrically to said claw tooth magnetic poles, and the field current flows through a path including said one end of said field coil, said claw tooth magnetic poles, said hub, said mounting screw, said collector conductor and said first brush.

3. An AC generator according to claim 1, wherein the head of said mounting screw is in sliding contact with said first brush, said one end of said field coil is connected electrically to said claw tooth magnetic poles, and the field current flows through a path including said one end of said field coil, said claw tooth magnetic poles, said hub, said mounting screw and said first brush.

4. An AC generator according to claim 1, wherein said collector device further includes a collector conductor for electrically connecting said one end of said field coil 2 said mounting screw, the head of said mounting screw is in sliding contact with said first brush, and the field current flows through a path including said one end of said field coil, said collector conductor, said mounting screw and said first brush.

* * * * *